(12) United States Patent
Tsusaka et al.

(10) Patent No.: US 7,784,083 B2
(45) Date of Patent: Aug. 24, 2010

(54) RECEIVING/GENERATING SECTION INFORMATION FOR MULTIMEDIA CONTENTS BASED ON LEVEL OF PERFORMANCE

(75) Inventors: Yuko Tsusaka, Osaka (JP); Kentaro Tanikawa, Kadoma (JP); Toshihisa Abe, Izumisano (JP)

(73) Assignee: Panasonic Corporation, Osaka (JP)

( * ) Notice: Subject to any disclaimer, the term of this patent is extended or adjusted under 35 U.S.C. 154(b) by 458 days.

(21) Appl. No.: 10/561,924

(22) PCT Filed: Jul. 2, 2004

(86) PCT No.: PCT/JP2004/009770

§ 371 (c)(1),
(2), (4) Date: Dec. 22, 2005

(87) PCT Pub. No.: WO2005/004480

PCT Pub. Date: Jan. 13, 2005

(65) Prior Publication Data

US 2007/0008909 A1   Jan. 11, 2007

(30) Foreign Application Priority Data

Jul. 8, 2003   (JP) .............................. 2003-271927

(51) Int. Cl.
*H04N 7/173* (2006.01)
*G06F 15/16* (2006.01)

(52) U.S. Cl. ...................................... 725/134; 709/203
(58) Field of Classification Search ................. 725/134; 709/201–203
See application file for complete search history.

(56) References Cited

U.S. PATENT DOCUMENTS 6,252,975 B1 * 6/2001 Bozdagi et al. ............. 382/107
7,159,234 B1 * 1/2007 Murphy et al. ................ 725/87
2002/0194480 A1   12/2002 Nagao (Continued)

FOREIGN PATENT DOCUMENTS

EP          0 690 413         1/1996

(Continued)

OTHER PUBLICATIONS

H. Zhang et al., Institute of Electrical and Electronics Engineers, "Structured and Content-based Video Browsing", Conference Record of the $32^{nd}$ Asilomar Conference on Signals, Systems & Computers, Pacific Grove, CA, Nov. 1-4, 1998, Asilomar Conference on Signals, Systems and Computers, New York, NY IEEE, US, vol. 1, 1998, pp. 910-914.

*Primary Examiner*—Scott Beliveau
*Assistant Examiner*—Bennett Ingvoldstad
(74) *Attorney, Agent, or Firm*—Wenderoth, Lind & Ponack, L.L.P.

(57) ABSTRACT

A home server including a contents storage unit storing contents, a control unit acquiring first section information from an information supply apparatus, a generating unit generating second section information, and a section information storage unit storing pieces of first and second section information by correlating them with contents. The information supply apparatus including a storage unit storing a plurality of pieces of first section information corresponding to a plurality of contents, and an extracting unit extracting pieces of first section information corresponding to the contents stored in the contents storage unit from the storage unit and supplying the extracted pieces of first section information to the home server.

21 Claims, 10 Drawing Sheets

U.S. PATENT DOCUMENTS

| | | | |
|---|---|---|---|
| 2003/0093790 A1* | 5/2003 | Logan et al. | 725/38 |
| 2003/0117428 A1 | 6/2003 | Li et al. | |
| 2006/0129627 A1* | 6/2006 | Phillips et al. | 709/200 |
| 2007/0033052 A1* | 2/2007 | Cowgill | 704/270.1 |
| 2008/0040341 A1* | 2/2008 | York et al. | 707/5 |

FOREIGN PATENT DOCUMENTS

| | | |
|---|---|---|
| EP | 1 016 991 | 7/2000 |
| JP | 11-250081 | 9/1999 |
| JP | 2000-250944 | 9/2000 |
| JP | 2001-126050 | 5/2001 |

\* cited by examiner

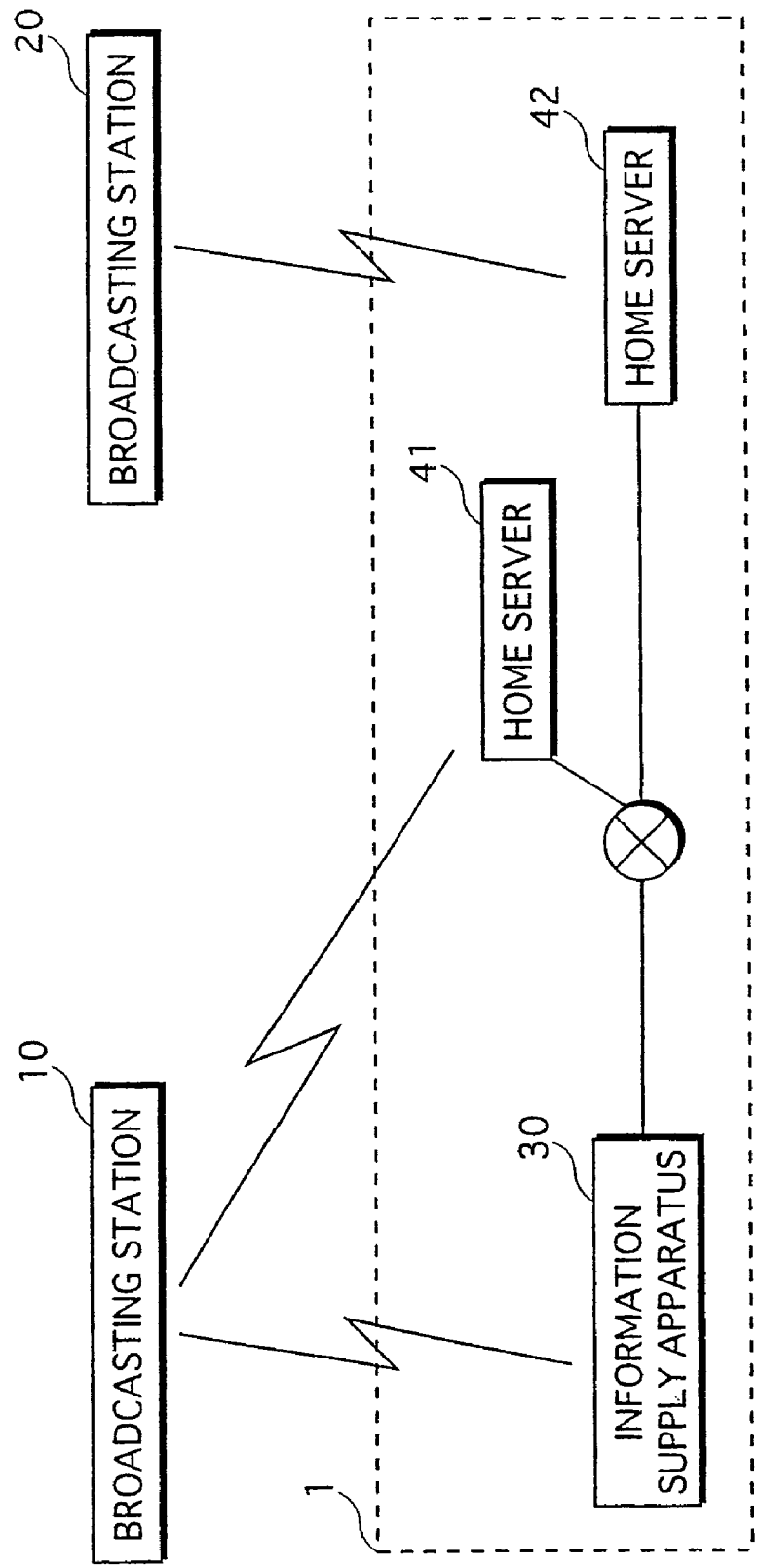

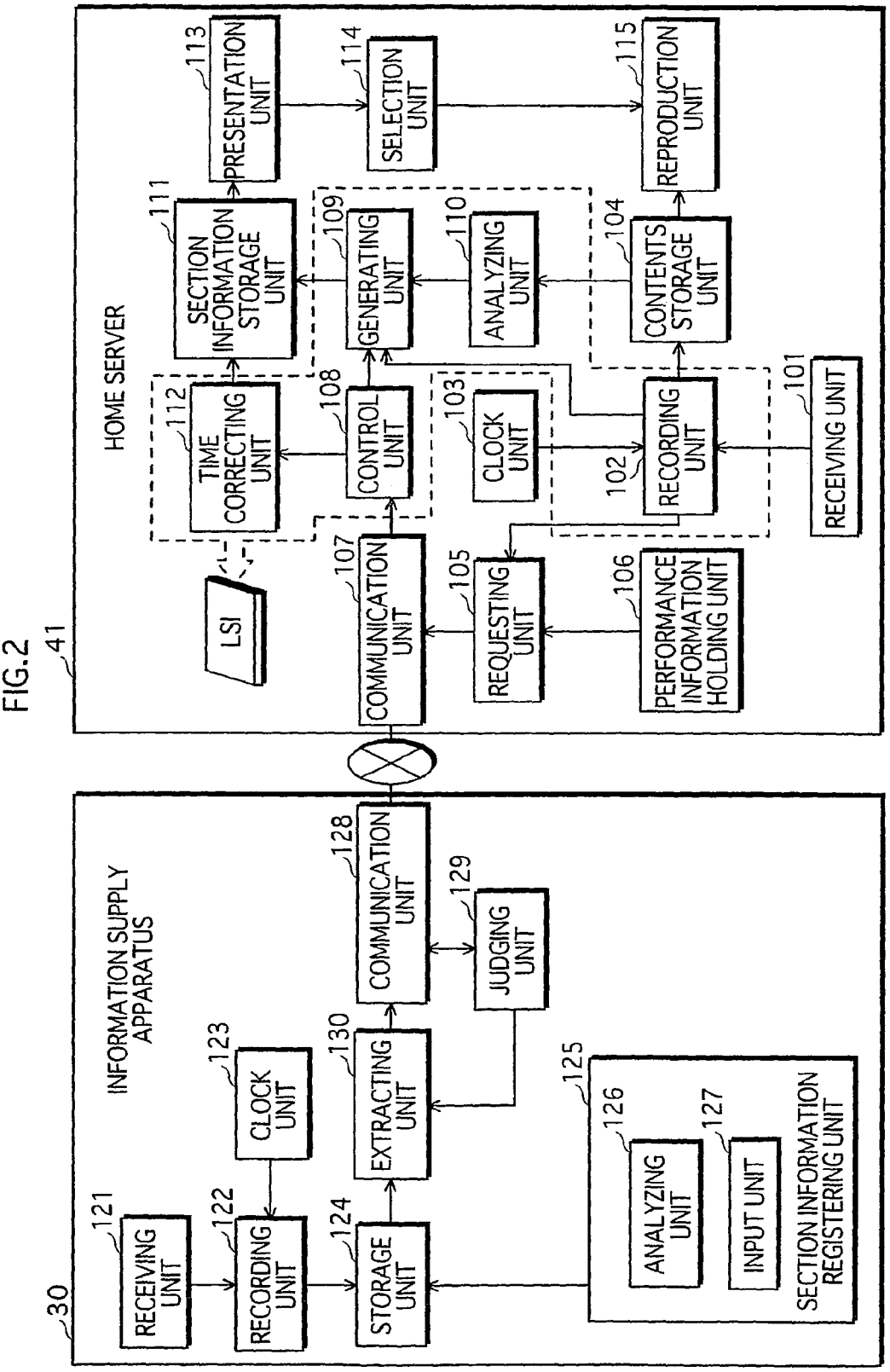

FIG.3A

| PERFORMANCE | CONTENT IDENTIFICATION | BROADCASTING AREA |

FIG.3B

| PERFORMANCE | CHANNEL | START TIME | END TIME | BROADCASTING AREA |

FIG.7

| HOME SERVER NAME | SUPPLY |
|---|---|
| homeserver HS1 | × |
| video recorder VR1 | ○ |
| DVD recorder DR3 | ○ |

FIG.8

| BROADCASTING TIME | AREA |
|---|---|
| 0:00~4:00 | TOKYO |
| 4:00~5:00 | TOKYO, OSAKA |
| 5:00~9:00 | NATIONWIDE |
| 9:00~12:00 | TOKYO, OSAKA, NAGOYA |
| 12:00~14:00 | NATIONWIDE |
| 14:00~18:00 | TOKYO |
| 18:00~18:30 | NATIONWIDE |
| 18:30~19:00 | TOKYO, OSAKA, NAGOYA |
| 19:00~23:00 | NATIONWIDE |
| 23:00~24:00 | TOKYO, OSAKA |

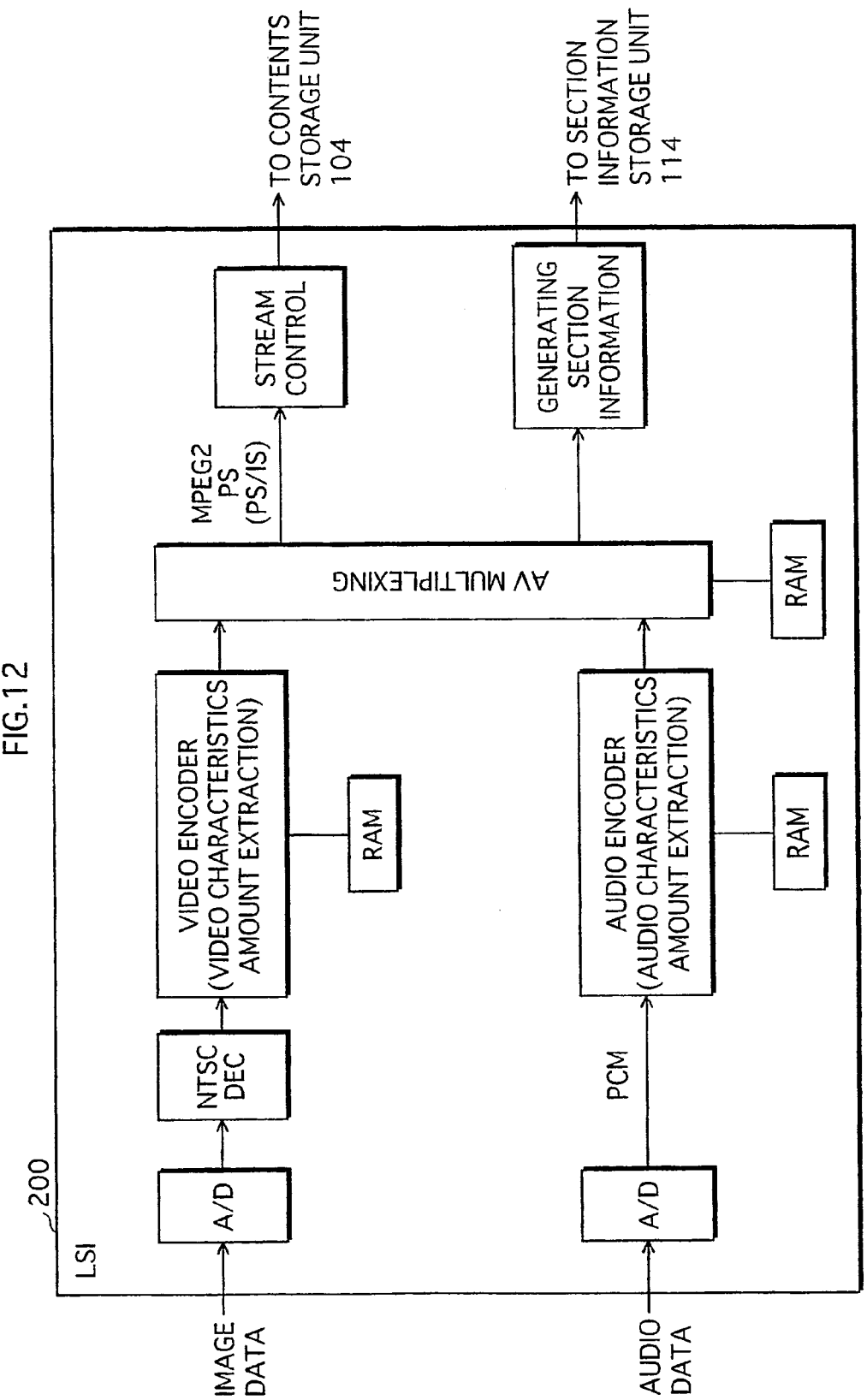

RECEIVING/GENERATING SECTION INFORMATION FOR MULTIMEDIA CONTENTS BASED ON LEVEL OF PERFORMANCE

BACKGROUND OF THE INVENTION

1. Field of the Invention

The present invention relates to a technology for dividing a content such as a TV broadcast program into a plurality of sections.

2. Description of the Related Art

What has become widely available in recent years is a home server which automatically records contents that suit users' tastes into a mass-capacity DVD or hard disk, based on keywords that have been registered in advance.

In the case where such a home server is used to record television broadcasts, the broadcasts are typically recorded in units of broadcast programs and they are regarded as separate contents. However, users may not necessarily desire to view each recorded program in its entirety, but often desire to view only part of the program.

For example, contents such as music programs or news programs can be divided into sections that are each meaningful and cohesive in substance, such as pieces of music or items of news. Users often desire to view only sections of the programs in which their favorite singers appear or interesting items of news are reported. As understood from this, there are cases where contents are each divided into a plurality of sections (hereinafter referred to as "meaningful sections") that are each cohesive in substance and users would like to select meaningful sections to view.

There are known techniques that analyze images and audio information of a content such as a broadcast program and divides the content into a plurality of sections based on a predetermined algorithm so that the users can view the content in units of divided sections.

In such known techniques, dividing each content into a plurality of sections so as to be close to or resemble the actual meaningful sections with high accuracy requires highly accurate complex analyses of images and audio information. Such analysis requires high processing ability and cost of the apparatus that performs the analysis. For this reason, this function is not suited for commercial home servers.

For the above-stated reason, there are systems in which a service center is provided with an information supply apparatus having high processing ability. The information supply apparatus divides each content into a plurality of sections, and supplies home servers, which are used by users at home and cannot divide the contents into sections, with section information which shows how each content is divided into sections. With such a construction, the users of the home servers can use the contents in units of sections that constitute the contents.

Meanwhile, the contents distributed to each home are increasing in amount and number due to widespread broadcasting services in variety such as ground-wave television broadcasting, satellite broadcasting, cable TV broadcasting, and video streaming distribution. It is therefore unrealistic for the information supply apparatus provided in the service center to analyze all of the contents distributed by the variety of broadcasting services to divide them into sections, and supply the section information to home servers. Accordingly, all of the pieces of section information for the contents are not supplied to the home servers. As a result, in terms of the contents for which the section information is not supplied from the information supply apparatus, home server users cannot view the contents in units of sections.

BRIEF SUMMARY OF THE INVENTION

It is a first object of the present invention to provide a contents storage system in which even in terms of the contents for which the section information is not supplied, home server apparatuses can use contents in units of sections that constitute the contents, with restricted price of the home server apparatuses.

It is a second object of the present invention to provide a home server apparatus and an information supply apparatus that are effectively used in the above-mentioned contents storage system.

It is a third object of the present invention to provide an integrated circuit for controlling the processing of the above-mentioned home server apparatus.

It is a fourth object of the present invention to provide a home server program for causing a computer to function as the above-mentioned home server apparatus.

The first object can be achieved by a contents storage system including: a home server apparatus for recording therein contents; and an information supply apparatus for supplying the home server apparatus with section information that shows how the contents are each divided into sections. The information supply apparatus comprising: a storage unit operable to store therein a plurality of pieces of section information corresponding to a plurality of contents; and a supply unit operable to read first section information, which corresponds to a content recorded in the home server apparatus, from the storage unit and supply the home server apparatus with the first section information. The home server apparatus comprising: a contents recording unit operable to acquire and record the content; a receiving unit operable to receive the first section information from the information supply apparatus; a generating unit operable to generate second section information corresponding to the recorded content; and a section information recording unit operable to record therein either the first section information or the second section information, as being in correspondence with the recorded content.

With the above-stated construction, the home server apparatus can use contents in units of sections using either the first section information received from the information supply apparatus or the second section information generated by the home server apparatus itself.

This makes it possible for the home server apparatus to use each content in units of sections even if the information supply apparatus does not supply section information for some contents. Compared with the case where a home server apparatus used at home is loaded with high processing ability, the home server apparatus in the contents storage system of the present invention can receive section information from the information supply apparatus having high processing ability. Therefore, the price of the home server apparatuses can be restricted. Also, the home server apparatus in the contents storage system of the present invention is characterized by being able to generate low-accuracy section information in correspondence with the contents for which high-accuracy section information is not supplied from the information supply apparatus. The contents storage system of the present invention can be applied to a use form in which an enterprise sets up the information supply apparatus and the home server apparatuses are sold for use at home. In such a use form, low-priced home server apparatuses will increase the users' willingness to buy.

Meanwhile, there are many types of commercial home server apparatuses with various levels of performance and price, including, off course, high-end models with high performance and price. The home server apparatuses as high-end models have high processing ability. However, the technology of image analysis used in the home server apparatuses to divide the contents into sections is fast-evolving. As a result, some users may refrain from buying a high-end home server apparatus in fear that an apparatus having higher performance than that may be put on sale after the purchase. The contents storage system of the present invention provides an effect that the users do not waver in buying a high-end home server apparatus since the users can receive highly accurate section information that was generated by the information supply apparatus with the most advanced technology.

The second object can be achieved by a home server apparatus for receiving section information, which shows how contents are each divided into sections, from an information supply apparatus. The home server apparatus comprising: a contents recording unit operable to acquire and record a content; a receiving unit operable to receive first section information, which corresponds to the recorded content, from the information supply apparatus; a generating unit operable to generate second section information corresponding to the recorded content; and a section information recording unit operable to record therein either the first section information or the second section information, as being in correspondence with the recorded content.

With the above-stated construction, the home server apparatus can use contents in units of sections using either the first section information received from the information supply apparatus or the second section information that the home server apparatus generated by itself.

This makes it possible for the home server apparatus to use each content in units of sections even if the information supply apparatus does not supply section information for some contents since it can use the second section information that the home server apparatus generated by itself.

In the above-stated home server apparatus, each content may be theoretically divided into meaningful sections that are each cohesive in substance, and sections indicated by the first section information are more close to meaningful sections of the recorded content than sections indicated by the second section information in length.

With the above-stated construction, the home server apparatus can receive the first section information, which has higher accuracy than the second section information that the home server apparatus generated by itself, from the information supply apparatus.

Accordingly, the home server apparatus can use the contents in units of sections that resemble the meaningful sections with high accuracy by using the highly accurate first section information.

In the above-stated home server apparatus, the first section information may be generated based on amounts of a plurality of types of characteristics detected through analysis of images and audio information contained in the recorded content, and the generating unit generates the second section information based on amounts of less types of characteristics than the types of characteristics on which generation of the first section information is based.

With the above-stated construction, the home server apparatus can receive the first section information, which is generated based on amounts of more types of characteristics than the types of characteristics on which generation of the second section information is based, from the information supply apparatus.

Accordingly, the home server apparatus can use the contents in units of sections that resemble the meaningful sections with high accuracy by using the highly accurate first section information received from the information supply apparatus, even if the home server apparatus itself does not have high processing ability required to generated such highly accurate section information.

In the above-stated home server apparatus, the generating unit may generate the second section information based on amounts of audio detected through analysis of audio information contained in the recorded content.

With the above-stated construction, the home server apparatus can generate the second section information based on amounts of audio detected through analysis of audio information contained in the recorded content, and further receive, from the information supply apparatus, the first section information that is generated by analyzing images and audio information.

Accordingly, the home server apparatus can use the contents in units of sections that resemble the meaningful sections with high accuracy by using the highly accurate first section information that is generated by the information supply apparatus by analyzing images, even if the home server apparatus itself does not have high processing ability to analyze images.

In the above-stated home server apparatus, the receiving unit may include: a requesting sub-unit operable to request the information supply apparatus to supply the first section information by sending identification information for identifying the recorded content to the information supply apparatus; and a receiving sub-unit unit operable to receive the first section information from the information supply apparatus, wherein the generating unit generates the second section information only if the information supply apparatus does not supply the home server apparatus with the first section information in response to the requesting, and wherein the section information recording unit records therein the first section information as being in correspondence with the recorded content if the information supply apparatus supplies the home server apparatus with the first section information, and records therein the second section information as being in correspondence with the recorded content if the information supply apparatus does not supply the home server apparatus with the first section information.

With the above-stated construction, the home server apparatus can use the contents in units of sections by using the first section information received from the information supply apparatus. Further, for contents for which the home server apparatus cannot receive the first section information, the home server apparatus can generate the second section information for the contents by itself.

This makes it possible for the home server apparatus to use each content in units of sections even if the information supply apparatus does not supply section information for some contents.

In the above-stated home server apparatus, the requesting sub-unit may further send criterion information, which is used for judging whether the first section information can be supplied, together with the identification information to the information supply apparatus, and the section information recording unit records therein the first section information as being in correspondence with the recorded content only if the information supply apparatus judges based on the criterion information that the first section information can be supplied and the receiving sub-unit receives the first section information from the information supply apparatus.

With the above-stated construction, the home server apparatus can send the criterion information to the information supply apparatus, and can receive the first section information only if the information supply apparatus judges based on the criterion information that the first section information can be supplied.

In the above-stated home server apparatus, the criterion information sent by the requesting sub-unit may indicate a level of performance of the generating unit in generating the section information.

There are many types of commercial home server apparatuses with various levels of performance and price. Of these, some high-end home server apparatuses may be able to generate the second section information that has the accuracy equal to or higher than the accuracy of the first section information supplied from the information supply apparatus. Such high-end home server apparatuses will not be able to make use of the high processing ability if they use only the first section information received from the information supply apparatus. The home server apparatus of the present invention solves the problem by allowing the home server apparatus to send, to the information supply apparatus, the criterion information indicating a level of performance of the home server apparatus in generating the section information.

This makes it possible for the home server apparatus to receive the first section information only when the first section information to be received has higher accuracy than the second section information that the home server apparatus generates by itself, and to use the second section information without receiving the first section information when the home server apparatus can generate the second section information that has accuracy equal to or higher than accuracy of the first section information. Accordingly, the home server apparatus can use the contents in units of sections that resemble the meaningful sections with high accuracy. Furthermore, in the case where the information supply apparatus provides the first section information on a chargeable basis, the home server apparatus can restrict the expense of the service by using the highly accurate second section information that the home server apparatus generates by itself.

In the above-stated home server apparatus, each piece of section information may indicate each section of each content by a start time of each section, and the generating unit generates the second section information by determining the start time of each section through analysis of the recorded content.

With the above-stated construction, the home server apparatus can use the contents in units of sections for which the start times are indicated.

In the above-stated home server apparatus, a time correcting unit is operable to correct the start time of each section indicated by the first section information by: receiving from the information supply apparatus (i) a portion of audio data of a content identified by the identification information and (ii) a reproduction time for the portion of audio data, the reproduction time having been measured by a same clock that has measured start times indicated by the first section information; calculating a difference between (iii) a reproduction time for the portion of audio data of the recorded content and (iv) the reproduction time received from the information supply apparatus; and correcting the start times indicated by the first section information by the calculated difference.

With the above-stated construction, the home server apparatus can correct the start times of the sections indicated by the first section information, based on the reproduction times of the contents stored in the contents storage unit.

With such a correction, even if contents are stored into the contents storage unit at wrong times because the clock of the home server apparatus is wrong, the contents can be reproduced in units of sub-contents with correct timing since the difference between the times provided by the clock and the clock that was used for generating the first section information is corrected.

The above-stated home server apparatus may further comprise: a selecting unit operable to select one of sections indicated by a piece of section information that has been recorded in the section information recording unit in correspondence with the recorded content; and a reproducing unit operable to reproduce the recorded content from a start time of the selected section.

With the above-stated construction, it is possible to reproduce a content from a desired start time of a section indicated by the section information.

This accordingly enables the home server apparatus user to view only such sections that are interesting to him/her.

In the above-stated home server apparatus, the section information may indicate, for each section, a characteristic image display time being a time at which an image, which is used to determine what each section concerns, is displayed. Further, home server apparatus may further comprise: a presentation unit operable to display, as a list, images that are to be displayed at characteristic image display times indicated by the section information, wherein the selecting unit selects a section that corresponds to an image that a user selects from the displayed list of images.

The above-stated construction enables the home server apparatus user to select a section of a content by referring to the images that show what the sections concern, and reproduce the content from the selected section.

With such a construction, the home server apparatus user can easily select a section that is interesting to him/her.

In the above-stated home server apparatus, the information supply apparatus may store a plurality of pieces of section information for each content, the requesting sub-unit further sends selection criterion information, which is used by the information supply apparatus to select a piece of section information, to the information supply apparatus, and the receiving sub-unit receives a piece of section information that was selected based on the selection criterion information, from the information supply apparatus.

With the above-stated construction, the user of the home server apparatus can receive a desired piece of section information as the first section information when the information supply apparatus stores a plurality of pieces of section information for each content.

In the above-stated home server apparatus, the information supply apparatus may store a plurality of pieces of section information for each content, the plurality of pieces of section information respectively corresponding to a plurality of broadcasting areas, and the selection criterion information indicates a broadcasting area to which the home server apparatus belongs.

With the above-stated construction, if different contents are respectively provided in a plurality of broadcasting areas, the home server apparatus can receive a piece of first section information that suits for the broadcasting area to which the home server apparatus belongs.

In the above-stated home server apparatus, the requesting by the requesting sub-unit may be inhibited while the contents recording unit is recording a content, and may be executed after the contents recording unit records a content, the generating unit generates third section information while the contents recording unit records a content, the third section information corresponds to sections of the currently recorded content that have already been recorded by the contents recording unit, and the section information recording unit records therein the third section information as being in correspondence with the currently recorded content if the contents recording unit is in the middle of recording the content, and records therein the first section information as being in correspondence with the content if the first section information is supplied after the content is recorded.

With the above-stated construction, the home server apparatus can generate the third section information while the home server apparatus records a content, and receive the first section information from the information supply apparatus after the recording is completed.

Accordingly, when the user of the home server apparatus views a content with what is called "chase viewing" in which the user views the content while recording it, the home server apparatus can use the third section information. This prevents the traffic of the communication line from increasing, which would happen if the home server apparatus were to receive the first section information from the information supply apparatus, portion by portion as the recording of the content proceeds. Also, the home server apparatus can receive the highly accurate first section information from the information supply apparatus when the user views the content after the content has been recorded.

The above-stated home server apparatus may further comprise: a communication judging unit operable to judge whether a communication with the information supply apparatus is possible, wherein if the communication judging unit judges that a communication with the information supply apparatus is not possible, the requesting by the requesting sub-unit is inhibited, the generating unit generates the second section information, and the section information recording unit records therein the second section information as being in correspondence with the recorded content.

With the above-stated construction, the home server apparatus can generate the second section information even if there is a defect in the communication line or even if the home server apparatus is used without being connected to the communication line. This enables the home server apparatus user to use the contents in units of sections.

The above-stated home server apparatus may further comprise: a request receiving unit operable to receive, from another home server apparatus, (i) identification information for identifying a predetermined content stored in the another home server apparatus, and (ii) criterion information to be used for judging whether a piece of section information for the predetermined content can be supplied; a judging unit operable to judge based on the criterion information whether to supply the another home server apparatus with the piece of section information for the predetermined content; and a supply unit operable to supply the another home server apparatus with the piece of section information for the predetermined content if the judging unit judges positively and the piece of section information for the predetermined content is stored in the section information recording unit, wherein, if the judging unit judges positively and the piece of section information for the predetermined content is not stored in the section information recording unit, then the generating unit generates the piece of section information for the predetermined content, and the supply unit supplies the another home server apparatus with the piece of section information for the predetermined content.

With the above-stated construction, when a plurality of home server apparatuses are interconnected, a home server apparatus can supply the section information to other home server apparatuses based on the criterion information.

In the above-stated home server apparatus, the criterion information may indicate a level of performance of the another home server apparatus, and the judging unit judges negatively if the level of performance of the another home server apparatus indicated by the criterion information is equal to or higher than a level of performance of the home server apparatus, and judges positively if the level of performance of the another home server apparatus is lower than the level of performance of the home server apparatus.

With the above-stated construction, when a plurality of home server apparatuses are interconnected, a home server apparatus can receive the criterion information that indicates a level of performance of another home server apparatus, and supply the section information to the other home server apparatus only if the other home server apparatus can generate section information with lower accuracy than the accuracy of the section information generated by the home server apparatus.

With such a construction, in a system in which a plurality of home server apparatuses are interconnected, the section information generated by a home server apparatus that can generate section information with highest accuracy can be used by the other home server apparatuses.

The second object can be achieved by an information supply apparatus for supplying a home server apparatus with section information that shows how contents are each divided into sections. The information supply apparatus comprising: a storage unit operable to store therein a plurality of pieces of section information corresponding to a plurality of contents; a receiving unit operable to receive, from the home server apparatus, identification information for identifying a predetermined content stored in the home server apparatus; and a supply unit operable to, if a piece of section information corresponding to the predetermined content identified by the received identification information is stored in the storage unit, read the piece of section information from the storage unit and supply the home server apparatus with the read piece of section information.

With the above-stated construction, the information supply apparatus can supply the section information in response to a request from a home server apparatus.

This enables the home server apparatuses, which do not have high processing ability, to use the highly accurate section information supplied from the information supply apparatus.

The above-stated information supply apparatus may further comprise: a judging unit operable to judge whether to supply the home server apparatus with the piece of section information corresponding to the predetermined content, based on criterion information which is used for the judgment, wherein the receiving unit further receives the criterion information from the home server apparatus, and wherein the supply unit supplies the home server apparatus with the piece of section information corresponding to the predetermined content if the judging unit judges positively.

With the above-stated construction, the information supply apparatus, which receives the criterion information from the home server apparatus, supplies the section information to the home server apparatus only if the information supply apparatus judges based on the criterion information that the section information can be supplied.

With such a restricted supply of the section information, in which the section information is supplied only when certain conditions are met, the traffic of the communication line is prevented from increasing.

In the above-stated information supply apparatus, the criterion information may indicate a level of performance of the home server apparatus, and the judging unit judges negatively if the level of performance indicated by the criterion information is equal to or higher than a level of performance stored in the storage unit, and judges positively if the level of performance indicated by the criterion information is lower than the level of performance stored in the storage unit.

With the above-stated construction, the information supply apparatus can refrain from supplying the section information to home server apparatuses that have an ability to generate highly accurate section information, supplying the section information only to home server apparatuses that do not have such ability.

With such a restricted supply of the section information, the traffic of the communication line is prevented from increasing.

In the above-stated information supply apparatus, the content may be distributed by television broadcasting, the identification information indicates (i) a channel that is a distribution source of the content and (ii) a broadcast time of the content, the supply unit reads, from the storage unit, a piece of section information that corresponds to a content identified by the channel and the broadcast time indicated by the identification information, and supplies the home server apparatus with the read piece of section information.

With the above-stated construction, the information supply apparatus can supply the home server apparatus with the section information for the contents which are distributed in accordance with a predetermined schedule.

The third object can be achieved by an integrated circuit for a home server apparatus that receives section information, which shows how contents are each divided into sections, from an information supply apparatus, the home server apparatus including a storage unit. The integrated circuit comprising: a recording unit operable to record a content into the storage unit; a receiving unit operable to receive first section information, which corresponds to the recorded content, from the information supply apparatus; a generating unit operable to generate second section information corresponding to the recorded content; and a section information recording unit operable to record either the first section information or the second section information in the storage unit, as being in correspondence with the recorded content.

With the above-stated construction, the home server apparatus having the integrated circuit can use contents in units of sections using either the first section information received from the information supply apparatus or the second section information generated by the home server apparatus itself.

This makes it possible for the home server apparatus to use each content in units of sections even if the information supply apparatus does not supply section information for some contents.

The fourth object can be achieved by a program for causing a computer to execute a process of recording contents and section information that shows how the contents are each divided into sections, into a storage apparatus. The program comprising: a recording step for recording a content into the storage apparatus; a receiving step for receiving first section information, which corresponds to the recorded content, from an information supply apparatus for supplying the section information; a generating step for generating second section information corresponding to the recorded content; and a section information recording step for recording either the first section information or the second section information into the storage apparatus, as being in correspondence with the recorded content.

With the above-stated construction, the computer under control of the home server program can use contents in units of sections using either the first section information received from the information supply apparatus or the second section information generated by the computer itself.

This makes it possible for the home server apparatus (computer) to use each content in units of sections even if the information supply apparatus does not supply section information for some contents.

BRIEF DESCRIPTION OF THE DRAWINGS

FIG. 1 shows how a contents storage system 1 of the present invention is used.

FIG. 2 shows the construction of the information supply apparatus 30 and the home server 41.

FIGS. 3A and 3B show examples of the data structure of the request information generated by the requesting unit 105.

FIG. 7 shows the data structure of the server performance table held by the judging unit 129.

FIG. 8 shows the data structure of the area table held by the judging unit 129.

FIG. 12 shows an example of an LSI in which the recording unit 102, generating unit 109 and analyzing unit 110 are integrated in one chip.

DETAILED DESCRIPTION OF THE INVENTION

Figure 4:
FIG. 4 shows the data structure of the section information.

The following describes a preferred embodiment of the present invention with reference to the attached figures.

<Construction>

FIG. 1 shows how a contents storage system 1 of the present invention is used.

The contents storage system 1 includes an information supply apparatus 30, a home server 41, and a home server 42 which are interconnected via a communication network such as the Internet. It should be noted here that although the contents storage system 1 of the present embodiment includes two home servers, the contents storage system of the present invention may include only one home server or three or more home servers.

Broadcasting stations 10 and 20 are local broadcasting stations for performing analog television broadcasts for respective geographical areas that are distant from each other.

The broadcasting stations 10 and 20 are affiliated with the same broadcast network, and affiliated with national and local broadcasting. In the national broadcasting, the broadcasting stations 10 and 20 broadcast the same contents as scheduled in the time table, and in local broadcasting, they broadcast different contents.

It should be noted here that although the contents storage system of the present invention can use contents provided from a plurality of broadcasting stations, but in the present embodiment, it is presumed for the sake of convenience that each of the information supply apparatus 30, home server 41, and home server 42 receives broadcasts from one of the broadcasting stations 10 and 20.

The information supply apparatus 30 is a computer for business use that supplies section information via the communication network to home servers for home use. More specifically, the information supply apparatus 30 includes a processor, a ROM, a RAM, a hard disk drive, an antenna, a receiving circuit or the like, and realizes a function of supplying the home servers 41 and 42 with the section information as the processor operates in accordance with a program stored in the ROM. The information supply apparatus 30 is located in an area in which broadcast waves from the broadcasting station 10 are received.

In the present embodiment, the section information is information that shows sections into which a content is divided. It should be noted here that although a content is divided into sections based on the analysis of images or audio information or by operator's operations, the generated sections may not match "meaningful sections" that are each cohesive in substance. For example, a typical news program includes such topics as economy, weather report, and sports. Sections of the news program that provide such topics are regarded as meaningful sections.

Hereinafter, in the present embodiment, the sections into which a content is divided based on the analysis of images or audio information or by operator's operations are referred to as sub-contents.

The home servers 41 and 42 are home servers for home use for storing broadcast contents. More specifically, each home server includes a processor, a ROM, a RAM, a hard disk drive, an antenna, a receiving circuit or the like, and realizes functions of recording and reproducing contents or obtaining the section information from the information supply apparatus 30 as the processor operates in accordance with a program stored in the ROM. The home servers 41 and 42 respectively receive broadcasts from the broadcasting stations 10 and 20 due to the difference in location.

Now, the home server 41 will be described in detail in terms of the construction and the functions that are realized as the processor of the home server 41 operates in accordance with the program stored in the ROM.

FIG. 2 shows the construction of the information supply apparatus 30 and the home server 41.

The home server 41 includes such functional blocks as a receiving unit 101, a recording unit 102, a clock unit 103, a contents storage unit 104, a requesting unit 105, a performance information holding unit 106, a communication unit 107, a control unit 108, a generating unit 109, an analyzing unit 110, a section information storage unit 111, a time correcting unit 112, a presentation unit 113, a selection unit 114, and a reproduction unit 115.

The home server 41 has a function of selecting contents that suit users' tastes and recording the selected contents automatically, where the contents are selected based on the EPG (Electronic Program Guide) and keywords that have been obtained from the broadcasting waves and registered in advance, respectively. Techniques of selecting contents that suit users' tastes are known, and the description of such techniques is omitted here.

The receiving unit 101 includes an antenna, a receiving circuit or the like, receives broadcast waves from the broadcasting station 10, obtains contents and EPG from the received broadcast waves, and outputs the obtained contents and EPG to the recording unit 102.

The recording unit 102, when the current time indicated by the clock unit 103 reaches a scheduled broadcast start time of a selected content, converts the content received from the receiving unit 101 into digital data, encodes the digital data, which contains video and audio data, using an encoding technique such as MPEG2 (Moving Picture Experts Group phase 2), and records the encoded content into the contents storage unit 104. Also, the recording unit 102 records attribute information (broadcasting time, channel, and the like) of the content into the contents storage unit 104, together with the content.

The clock unit 103 outputs time information, which is used for controlling the start and end of a recording, to the recording unit 102.

The contents storage unit 104, which is a recording medium such as a DVD or a hard disk, stores therein the encoded contents.

The requesting unit 105 generates request information for the contents recorded in the contents storage unit 104 by the recording unit 102, and sends the request information to the information supply apparatus 30 via the communication unit 107. The request information is sent to the information supply apparatus by the home server when requesting supply of section information, and has the data structure, which will be described later, for indicating the performance of the home server and a recorded content.

In regards with the timing with which the requesting unit 105 sends the request information to the information supply apparatus 30, the requesting unit 105 may send request information each time the recording unit 102 ends recording a content, or regularly, or after receiving an instruction to do so from the user. Furthermore, in the case where the requesting unit 105 sends the request information each time the recording unit 102 ends recording a content, the requesting unit 105 may send it after a predetermined wait time that depends on the content size, taking into consideration the time required by the information supply apparatus 30 for generating the section information.

FIGS. 3A and 3B show examples of the data structure of the request information generated by the requesting unit 105.

The request information includes performance information, identification information (e.g., content identification), and broadcasting area information.

The performance information shows the performance of the home server 41. In the present embodiment, the performance information shows the performance with which the home server 41 generates the section information, and the performance is identified by the product name and the model number of the home server 41. The product name and the model number are stored in the performance information holding unit 106. It should be noted here that the accuracy of dividing a content into sub-contents improves if the accuracy of analyzing video and audio data improves or the algorithm for synthesizing the analysis results improves. As a result, the performance may be improved by updating the algorithm after the product is placed on the market. In such a case, the information held by the performance information holding unit 106 is also updated. It should be noted here that in the present embodiment, the "accuracy of dividing a content into sub-contents" or the "accuracy of section information" indicates an accuracy with which each sub-content shown by the section information resembles a meaningful section that was originally intended, more specifically an accuracy with which a position of a boundary between sub-sections resembles a position of a boundary between meaningful sections.

The identification information is information for identifying a target content. The identification information may be an identifier of a content, as shown in FIG. 3A. Alternatively, the identification information may be indication of a channel for identifying the broadcasting station that broadcasts the target content, and broadcast start and end times of the target content. In the present embodiment, the data structure shown in FIG. 3B is used.

The broadcasting area information shows an area in which the home server 41 is located, and the broadcasting station that broadcasts programs to the home server 41 can be identified from the shown area. The area in which the home server 41 is located is registered with the home server 41 by the user operation in advance.

Referring back to FIG. 2, the communication unit 107 controls communications performed with other apparatuses via the communication network.

The control unit 108 controls the generating unit 109 and the time correcting unit 112 so that the section information is recorded into the section information storage unit 111. During a period between the start and end of a recording of a content by the recording unit 102, the control unit 108 instructs the generating unit 109 to generate pieces of partial section information that correspond to portions of the content that have already been recorded. With this construction, while a recording of a content proceeds, the user can view a recorded sub-content of the content with an immediate access. Also, after a target content has been recorded, when the home server 41 receives the section information and a portion of audio data of the target content from the information supply apparatus 30 in response to the request information sent from the requesting unit 105 to the information supply apparatus 30, the control unit 108 outputs the received information to the time correcting unit 112 with an instruction to correct the section information and store the corrected section information into the section information storage unit 111.

In the present embodiment, "lapse information" is attached to the portion of audio data that is supplied from the information supply apparatus 30 to the home server 41, where the lapse information indicates a lapse of time from the start of the content to the portion of audio data. If the information supply apparatus 30 does not supply the home server 41 with the section information in response to the request information, the control unit 108 instructs the generating unit 109 to generate section information and store the generated section information into the section information storage unit 111.

The generating unit 109 generates the section information under control of the control unit 108. More specifically, the generating unit 109 divides a target content into a plurality of sub-contents by a predetermined algorithm, using analysis results provided from the analyzing unit 110 and analysis results obtained through the encoding process performed by the recording unit 102, generates section information that indicates a start time and a "characteristic image display time" of each sub-content, and stores the generated section information into the section information storage unit 111, correlating it with the target content. It should be noted here that the "characteristic image display time" means the time at which an image, which contains predetermined types of information that can be used to determine what the sub-content concerns, is displayed. A type of information that is contained in the image to be used to determine what the sub-content concerns is, for example, a telop (e.g., text superimposed on the screen). If the section information storage unit 111 has stored a piece of section information when it receives a new piece of section information corresponding to the same target content, the generating unit 109 updates the old piece of section information with the new piece of section information.

FIG. 4 shows the data structure of the section information. Each piece of section information is composed of as many pieces of sub-content information as the number of sub-contents contained in a content that corresponds to the piece of section information. Each piece of sub-content information includes a start time and a "characteristic image display time" of a corresponding sub-content. Each of the start time and the characteristic image display time for a sub-content is represented by, for example, a length of time that elapses after the start of the content.

Referring back to FIG. 2, the analyzing unit 110 analyzes images and audio information and outputs the analysis results to the generating unit 109 for use in generation of the section information.

Meanwhile, there are various conventional technologies that can be used for dividing a content into a plurality of sub-contents. For example, a commercial message (hereinafter referred to as CM), which typically lasts for 15 seconds and is sandwiched by silences which each last for more than a predetermined time period, may be detected; a telop may be detected from a screen image based on the number of edges of luminance in horizontal and vertical directions; a change of scenes may be detected by detecting a change in color distribution between consecutive images in time series; or a piece of music may be detected by detecting a periodical change of audio.

When a content is divided into sub-contents by a mechanical method of applying a predetermined algorithm to the analysis of images and audio information to detect a predetermined amount of any of the above-mentioned characteristics and determining start times of the sub-contents, the sub-contents may not necessarily match the meaningful sections. For example, when dividing a content with portions which each last for a period with the audio level lower than a threshold value, the content is often divided into sub-contents that are higher in number than meaningful sections.

It is possible to increase the accuracy of section information by increasing the amount and types of the characteristics detected through the analysis of images and audio information to be used for dividing the content, and generating the section information using the results of the analysis. However, the more the number of types of characteristics is, the larger the load required for the analysis is. More specifically, it is possible to increase the accuracy by dividing a content with ends of CMs that are immediately followed by telops, instead of dividing a content with ends of CMs, which can be realized by analyzing only the sound volume levels. However, detecting a telop requires a high processing performance since it requires analysis of the image luminance, thus increasing the price of the apparatus.

In the home server 41 of the present embodiment, the analyzing unit 110 analyzes only the sound volume levels for the sake of simplification, and the generating unit 109 divides a content into a plurality of sub-contents with ends of CMs, where the start and end of each CM can be detected by analyzing only the sound volume levels. With this construction, the home server 41 cannot detect telops since the analyzing unit 110 does not analyze images. As a result, the generating unit 109 determines the characteristic image display time for each sub-content as a predetermined time period (for example, three seconds) after the start of the sub-content.

The section information storage unit 111 is a recording medium similar to the contents storage unit 104, and stores therein pieces of section information, which are output from the generating unit 109 and the time correcting unit 112, by correlating them with contents.

The time correcting unit 112, under control of the control unit 108, corrects the section information supplied from the information supply apparatus 30, and records the corrected section information into the section information storage unit 111.

The time correcting unit 112 performs a comparison between (a) the audio data that is supplied together with the section information and (b) the audio data that is stored in the contents storage unit 104, for each corresponding content, detects a point in time at which sound volume level waveforms of the two pieces of audio data match, detects a difference between (i) the time indicated by the lapse information attached to the supplied portion of audio data and (ii) the time that lapses from the reproduction start of the target content to the detected point in time, corrects the start time and the characteristic image display time of the section information, and stores the corrected section information into the section information storage unit 111 by correlating it with a content. If the section information storage unit 111 has stored a piece of section information when it receives a new piece of section information corresponding to the same target content, the time correcting unit 112 updates the old piece of section information with the corrected piece of section information.

The correction of the section information in the above-stated manner will be explained in detail with an example case where a content is stored into the contents storage unit 104 five seconds late due to as much delay of the time provided from the clock unit 103 of the home server 41.

After recording a content, the home server 41 receives from the information supply apparatus 30 the section information and a portion of audio data at a position 30 seconds after the start of the content. In the present example, it is presumed that the time provided from the clock unit 123 of the information supply apparatus 30 is correct. In that case, the time correcting unit 112 detects a delay of 5 seconds because the waveform of the received portion of audio data (the portion that starts 30 seconds after the start of the content) matches the waveform of a portion of the audio data at a position 25 seconds after the start of the content that is stored in the contents storage unit 104. The time correcting unit 112 then corrects the start time and the characteristic image display time for each sub-content in the section information, by setting them forward by 5 seconds. For example, if the supplied section information indicates that the start time of the second sub-content is 3 minutes and 20 seconds after the start of the content, the time correcting unit 112 corrects the start time to 3 minutes and 15 seconds after the start of the content.

With such a correction, even if contents are stored into the contents storage unit 104 at wrong times because the clock unit 103 is wrong, the contents can be reproduced in units of sub-contents with correct timing since the difference between the times provided by the clock unit 103 and the clock that was used for generating the section information is corrected.

The presentation unit 113 displays a list of thumbnail images that are used to determine what the sub-contents concern. Upon receiving a user's instruction to display the list, the presentation unit 113 reads the section information for a specified content from the section information storage unit 111, generates thumbnail images by reducing the images of the sub-contents to be reproduced at the characteristic image display times that are indicated by the read section information, and displays a list of the generated thumbnail images on a monitor connected to the home server 41.

The selection unit 114 identifies a thumbnail image that the user selects from the list of thumbnail images displayed by the presentation unit 113, and notifies the reproduction unit 115 of the selected thumbnail image.

The reproduction unit 115 controls reproduction of contents. Upon receiving the notification of a selected thumbnail image from the selection unit 114, the reproduction unit 115 obtains, from the section information, the start time of the sub-content that corresponds to the selected thumbnail image, and reproduces the content containing the sub-content from the obtained start time.

With the above-stated construction, the home server 41 records the broadcast contents, obtains the highly accurate section information corresponding to the recorded contents, from the information supply apparatus 30. The construction makes it possible to reproduce the contents in units of sub-contents that resembles the meaningful sections with high accuracy. Also, if the home server 41 cannot be supplied with the section information from the information supply apparatus 30, the home server 41 can generate the section information with low accuracy by itself so that it can reproduce the contents in units of sub-contents.

It should be noted here that the home server 42 has the same construction as the home server 41, and therefore description thereof is omitted.

Now, the functions of the information supply apparatus 30, which are realized as the processor of the information supply apparatus 30 operates in accordance with the program stored in the ROM, will be described in detail.

The information supply apparatus 30 includes a receiving unit 121, a recording unit 122, a clock unit 123, a storage unit 124, a section information registering unit 125, a communication unit 128, a judging unit 129, and an extracting unit 130.

The receiving unit 121 includes an antenna, a receiving circuit or the like, receives broadcast waves from the broadcasting station 10, obtains contents from the received broadcast waves, and outputs the obtained contents to the recording unit 122.

The recording unit 122 has a time table showing the times at which contents are broadcast by the broadcasting station 10 with indication of national or local broadcasting for each content. When the time provided by the clock unit 123 reaches a scheduled broadcast start time of a national-broadcasting content, receives the content from the receiving unit 121, converts the received content into digital data, encodes the digital data, which contains video and audio data, using an encoding technique such as MPEG2, and records the encoded content into the contents storage unit 124.

The clock unit 123 outputs time information in synchronization with a clock that controls the broadcasting schedule in the broadcasting station 10.

The storage unit 124, which is a recording medium such as a DVD or a hard disk, stores therein the encoded contents by correlating them with pieces of section information registered by the section information registering unit 125.

The section information registering unit 125 includes two functional blocks, an analyzing unit 126 and an input unit 127.

The analyzing unit 126 analyzes images and audio information of contents stored in the storage unit 124 to detect CMs, telops, scenes, and pieces of music. The input unit 127 is achieved by an input device (for example, a keyboard) or the like, and receives data input from outside the information supply apparatus 30.

The section information registering unit 125 generates section information by analyzing images and audio information of national-broadcasting contents recorded by the recording unit 122, and records the generated section information into the storage unit 124 by corresponding them with contents. The section information registering unit 125 also receives pairs of a local-broadcasting content and a piece of section information from outside the information supply apparatus 30 via the input unit 127, and records the received pairs into the storage unit 124 by correlating the local-broadcasting content with the piece of section information in each pair. The local-broadcasting contents received by the section information registering unit 125 may be, for example, such contents that are broadcast in local areas having lots of home server users.

Figure 5:
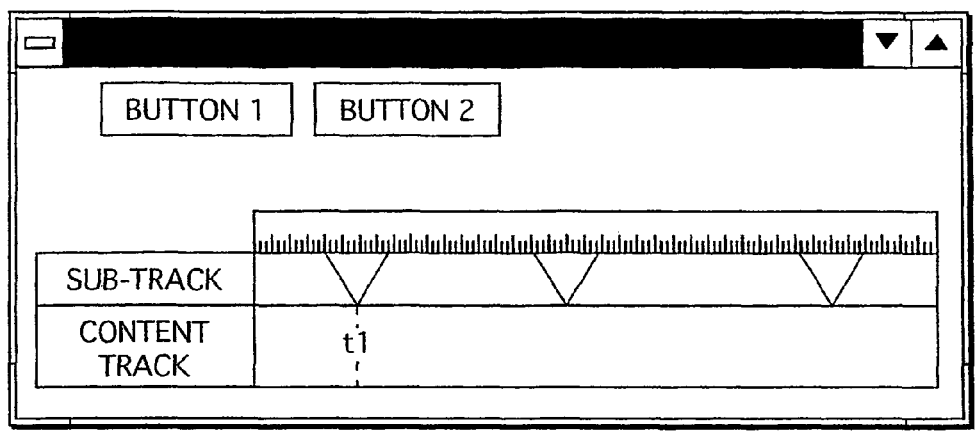
FIG. 5 shows an example of a GUI screen for editing the section information.
Figure 6:
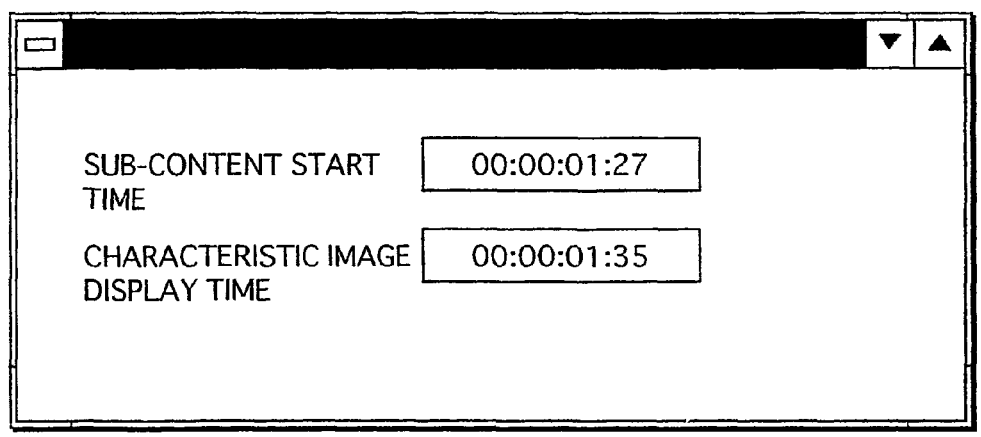
FIG. 6 shows an example of a GUI screen for inputting the start time and the characteristic image display time for a sub-content.

The section information registering unit 125 may display GUI screens, as shown in FIGS. 5 and 6, on a monitor connected to the information supply apparatus 30, receive instructions from the operator via the GUI screens, and correct the section information.

The correction of the section information via the GUI screens will be explained. FIG. 5 shows an example of a GUI screen for editing the section information.

The GUI screen shown in FIG. 5 contains buttons 1 and 2 and a sub-track and a content track represented on a time scale. The content track is represented by a box that extends in width in proportion to the reproduction time of the target content. The sub-track shows triangles that respectively indicate the start times of the sub-contents indicated by the correction-target section information.

When the operator selects one of the triangles displayed on the GUI screen shown in FIG. 5 and depresses button 1, a GUI screen shown in FIG. 6 is displayed. Also, when the operator depresses button 1 without selecting any triangle displayed on the GUI screen of FIG. 5, a new triangle is added to the GUI screen of FIG. 5 and a GUI screen shown in FIG. 6 is displayed.

FIG. 6 shows an example of a GUI screen for inputting the start time and the characteristic image display time for a sub-content.

The GUI screen shown in FIG. 6 contains fields into which the operator inputs the sub-content start time and the characteristic image display time.

If the operator inputs the sub-content start time (for example, time t1) and the characteristic image display time in the respective fields, the start time and the characteristic image display time for the currently selected sub-content are corrected, and the position of the triangle displayed on the GUI screen of FIG. 5 is shifted accordingly.

When the operator depresses button 2 on the GUI screen shown in FIG. 5, the section information reflecting the correction made on the GUI screen is stored into the storage unit 124.

With the above-described operation, it is possible to correct the start time and the characteristic image display time for sub-contents that are indicated by the section information generated by the section information registering unit 125 using the analysis results of the analyzing unit 126. This makes it possible to provide highly accurate section information. This is because the operator can correct the sub-content start times even if the mechanically detected sub-contents do not match actual meaningful sections when the analyzing unit 126 analyzes an unusual content that is divided into sub-contents with a different pattern. Also, since the operator can set the characteristic image display time subjectively, it is possible to select, as the characteristic image display time, a time at which an image suitable for appropriately determining what the sub-content concerns is displayed.

Back to the explanation of the components shown in FIG. 2, the communication unit 128 controls communications performed between the information supply apparatus 30 and other apparatuses via the communication network.

The judging unit 129 holds a server performance table shown in FIG. 7 and an area table shown in FIG. 8, and judges whether to supply a requested piece of section information to a requester home server, based on the request information received from the home server 41 or 42 via the communication unit 128.

The server performance table shown in FIG. 7 shows whether to supply the section information to home servers, for each pair of the product name and the model number of the home servers. The server performance table is set so that the section information is not supplied to the home servers that generate section information with an accuracy level equal to or higher than a predetermined level, and that the section information is supplied to the home servers that generate section information with an accuracy level lower than the predetermined level. It should be noted here that the accuracy level of the section information is determined based on (i) characteristics of the images and audio information that the home servers analyze, and (ii) the algorithms that the home servers use for synthesizing the analysis results.

The area table shown in FIG. 8 shows the areas of home servers to which the section information is supplied, for each content broadcasting time. The area table is set so that in terms of the national-broadcasting contents, the section information is supplied to nationwide home servers, and that in terms of the local-broadcasting contents, the section information is supplied only to the home servers of the areas corresponding to the section information that is registered by the section information registering unit 125. In contents storage system 1 of the present embodiment, a case where contents are received from a broadcasting station via a channel is described as an example. However, contents may be received from a plurality of broadcasting stations via a plurality of channels. In this case, the judging unit 129 holds a plurality of area tables in correspondence with the plurality of channels.

The judging unit 129 judges that a requested piece of section information should be sent to a requester home server if (i) the server performance table indicates that the section information can be supplied to the requester home server identified by the product name and the model number, and (ii) the area table indicates that the broadcasting area specified by the request information belongs to the areas to which the content specified by the request information can be supplied. When having judged so, the judging unit 129 instructs the extracting unit 130 to extract the section information corresponding to the content specified by the request information. Otherwise, the judging unit 129 judges that the requested piece of section information should not be sent to the requester home server, and notifies the requester home server via the communication unit 128 that the section information is not supplied.

The extracting unit 130, upon receiving an instruction from the judging unit 129, acquires (i) the section information corresponding to the content specified by the request information and (ii) a portion of audio data of the content, and transmits the acquired section information and portion of audio data to the requester home server via the communication unit 128.

With the above-described construction, the information supply apparatus 30 stores pieces of section information corresponding to national-broadcasting contents and local-broadcasting contents broadcast in the areas that have a lot of home server users, and supplies home servers used in the target areas with the stored pieces of section information. It is also possible to restrict the traffic in the communication network by not supplying the section information to the home servers that can generate highly accurate section information.

In the contents storage system 1 having the above-described construction, low-price home server 41 that cannot generate highly accurate section information can receive such highly accurate section information from the information supply apparatus 30 via the communication network. Also, in the case where the home server 41 is used in such an area to which the section information for local-broadcasting contents is not supplied from the information supply apparatus 30, the home server 41 can generate section information by itself, and the user of the home server 41 can use the local-broadcasting contents in units of sub-contents. Also, in the case where the communication network has a failure, or in the case where the home server 41 is used without being connected to the communication network, the home server 41 can generate section information by itself, and the user of the home server 41 can use the local-broadcasting contents in units of sub-contents.

<Operation>

Now, the operation procedure of the home server 41 for storing the section information will be described.

Figure 9:
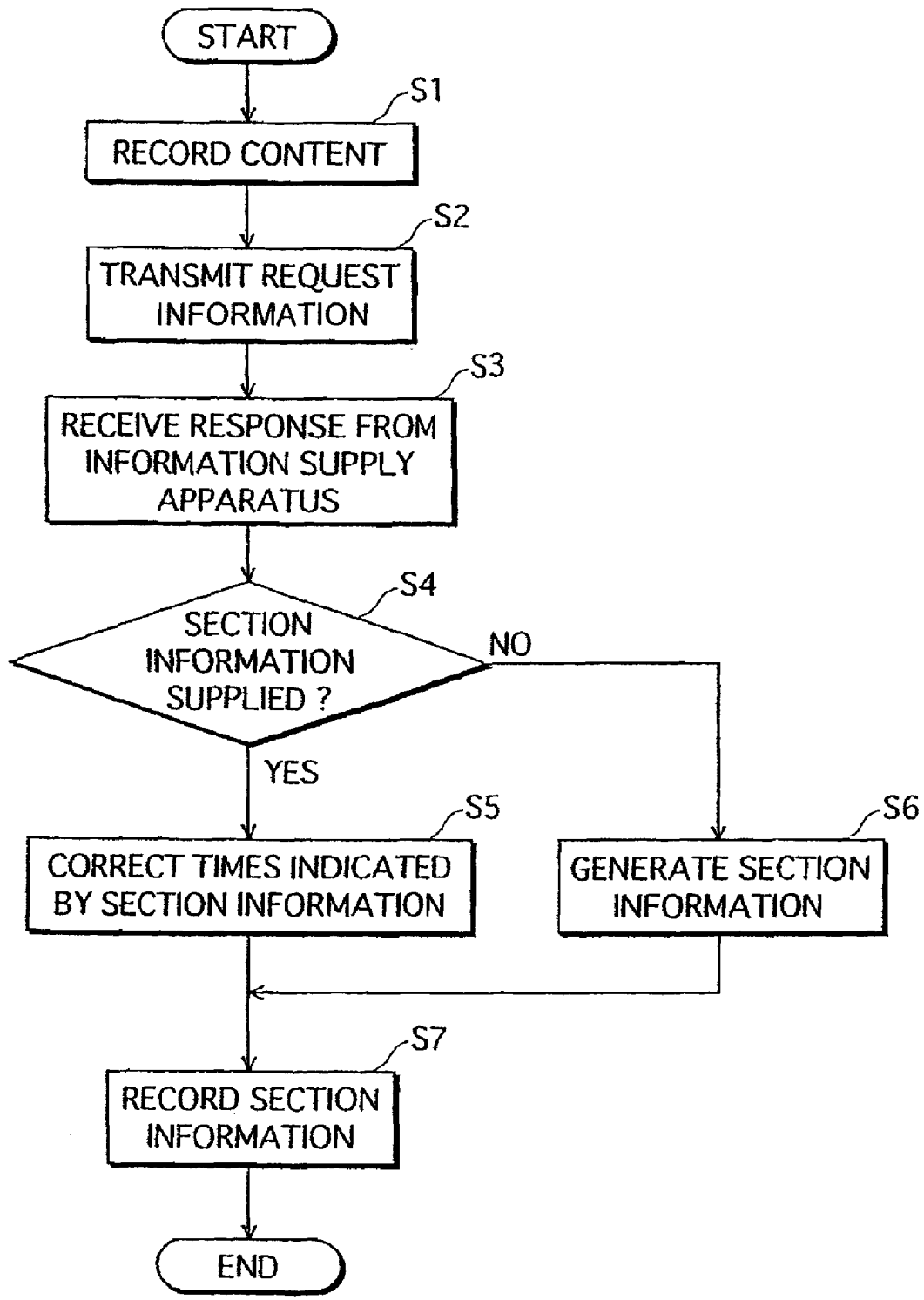
FIG. 9 is a flowchart showing the procedure of the home server 41.

FIG. 9 shows the procedure of the home server 41.

The recording unit 102 selects a content that suits the users' tastes, based on key words that have been registered in advance, and records the selected content into the contents storage unit 104 (S1). After the recording of the content by the recording unit 102, the requesting unit 105 sends the request information, which contains information indicating the performance of the home server 41 and information for identifying the recorded content, to the information supply apparatus 30 via the communication unit 107 (S2).

The control unit 108 receives a response to the request information from the information supply apparatus 30 (S3), and judges whether the received response includes section information and a portion of audio data (S4).

If the received response includes section information and a portion of audio data (YES in S4), the received section information and audio data are output to the time correcting unit 112. The time correcting unit 112 performs a comparison between (a) the audio data that is supplied together with the section information and (b) the audio data that is stored in the contents storage unit 104, for each corresponding content, detects a point in time at which sound volume level waveforms of the two pieces of audio data match, detects a difference between (i) the time indicated by the lapse information attached to the supplied portion of audio data and (ii) the time that lapses from the reproduction start of the target content to the detected point in time, and corrects the start time and the characteristic image display time of the section information (S5). If the received response does not include section information and a portion of audio data (NO in S4), the control unit 108 instructs the generating unit 109 to generate section information. Upon receiving the instruction, the generating unit 109 divides a target content into a plurality of sub-contents by a predetermined algorithm, using analysis results provided from the analyzing unit 110 and analysis results obtained through the encoding process performed by the recording unit 102, and generates section information that indicates the start and end times of each sub-content (S6).

The control unit 108 stores the section information corrected by the time correcting unit 112 or the section information generated by the generating unit 109 into the section information storage unit 111 by correlating it to a content (S7), and ends registration of the section information.

With the above-described operation, the home server 41 receives highly accurate section information from the information supply apparatus 30 and uses contents in units of sub-contents that resemble the meaningful sections with high accuracy. If the home server 41 cannot receive such highly accurate section information from the information supply apparatus 30, the home server 41 can generated section information by itself, and the user of the home server 41 can use every type of contents in units of sub-contents.

Now, the operation procedure of the information supply apparatus 30 for supplying the home server 41 with section information will be described.

Figure 10:
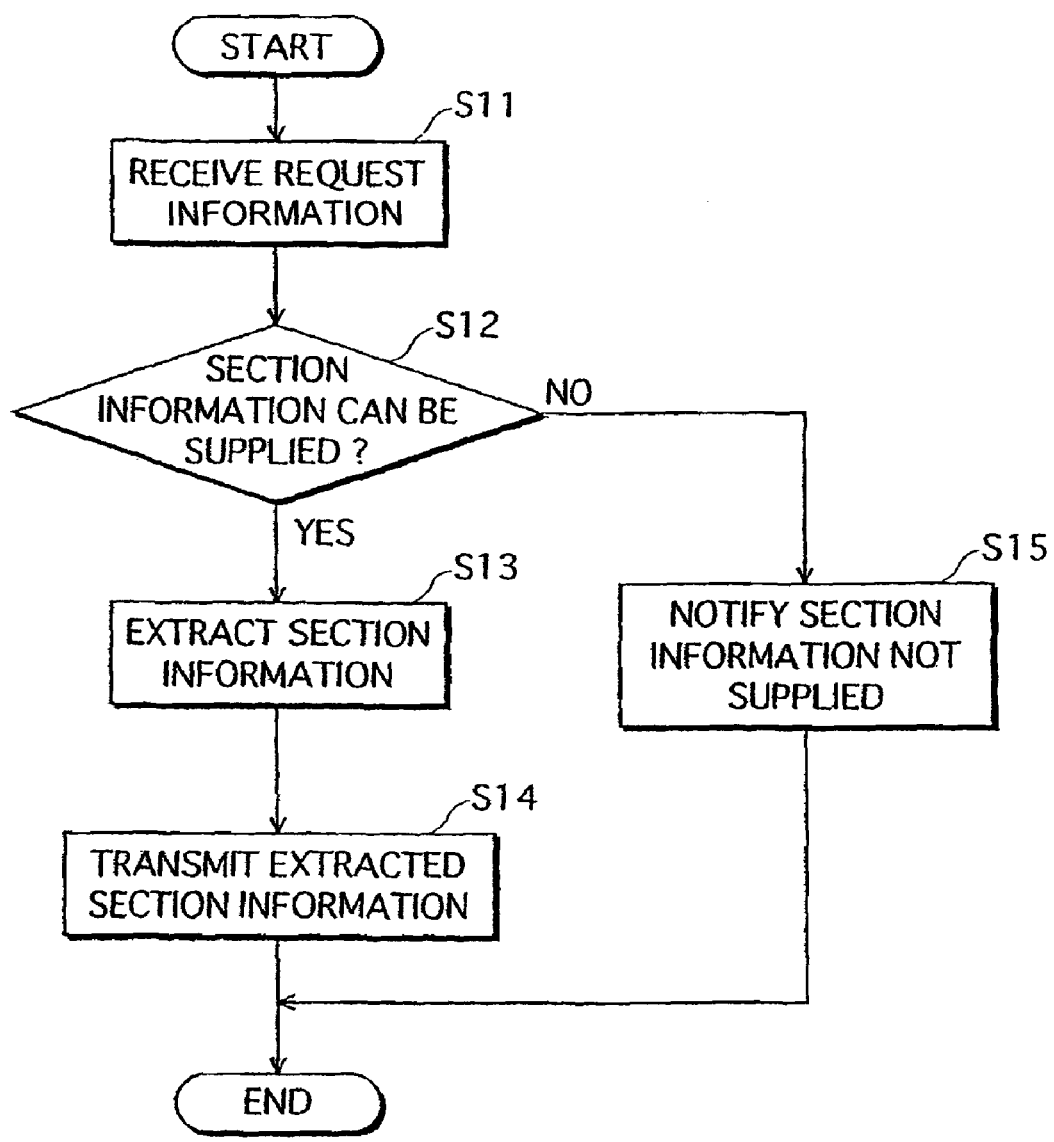
FIG. 10 is a flowchart showing the procedure of the information supply apparatus 30.

FIG. 10 shows the procedure of the information supply apparatus 30.

The judging unit 129 receives request information from the home server 41 via the communication unit 128 (S11), and judges whether to supply the home server 41 with section information corresponding to the content specified by the request information (S12).

If the server performance table indicates that the section information can be supplied to the requester home server identified by the product name and the model number (namely, the performance), and the area table indicates that the broadcasting area specified by the request information belongs to the areas to which the content specified by the request information can be supplied (YES in S12), the judging unit 129 instructs the extracting unit 130 to extract the section information corresponding to the content specified by the request information. Upon receiving the instruction, the extracting unit 130 extracts (i) the section information corresponding to the content specified by the request information, and (ii) a portion of audio data from the storage unit 124 (S13), transmits the extracted section information and audio data to the home server 41 via the communication unit 128 (S14), and ends the section information supply operation.

On the other hand, if the server performance table indicates that the section information cannot be supplied to the requester home server identified by the product name and the model number, or the area table indicates that the broadcasting area specified by the request information does not belong to the areas to which the content specified by the request information can be supplied (NO in S12), the judging unit 129 notifies the requester home server via the communication unit 128 that the section information is not supplied (S15), and ends the section information supply operation.

With the above-described operation, the information supply unit 30 can judge whether to supply section information to a requester home server 41, based on the area in which the requester home server 41 is used. It is also possible to restrict the traffic in the communication network by not supplying the section information to the home servers that can generate highly accurate section information.

Now, an example of a modification of the present invention will be described.

Figure 11:
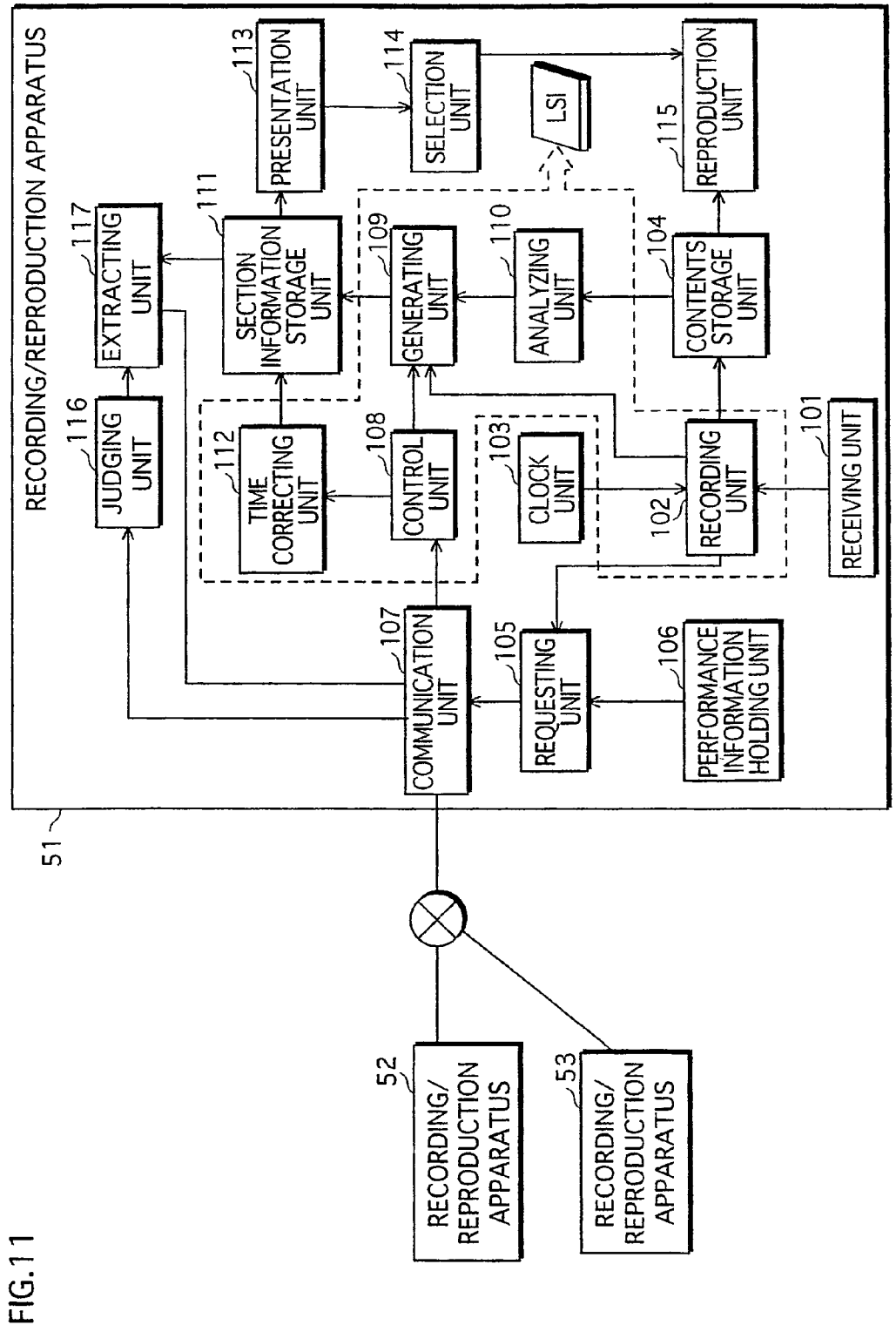
FIG. 11 shows a modification of the contents storage system of the present invention.

FIG. 11 shows a modification of the contents storage system of the present invention.

The contents storage system shown in FIG. 11 is what is called a home network system in which recording/reproduction apparatuses 51, 52 and 53 are interconnected by communication lines conforming to, for example, the IEEE (Institute of Electrical and Electronic Engineers) 1394 standard, that are wired in a house.

The recording/reproduction apparatuses 51, 52 and 53 each have recording and reproduction functions such as the home server, computer, DVD recorder, hard disk recorder, video recorder and the like.

The recording/reproduction apparatus 51 includes a judging unit 116 and an extracting unit 117 in addition to the components of the home server 41 shown in FIG. 2. The explanation of the components that are also included in the home server 41 (to which the same reference signs are attached) is omitted.

The judging unit 116 is a functional block that holds the server performance table shown in FIG. 7 and judges whether to supply a requested piece of section information to a requester recording/reproduction apparatus, based on the request information received from the recording/reproduction apparatuses 52 and 53 via the communication unit 107.

The judging unit 116 instructs the extracting unit 117 to extract the piece of section information corresponding to the content specified by the requested information if (i) the server performance table indicates that the section information can be supplied to the requester home server identified by the product name and the model number of the performance information, and (ii) the requested piece of section information is stored in the section information storage unit 111. On the other hand, if (i) the server performance table indicates that the section information can be supplied to the requester home server identified by the product name and the model number of the performance information, and (ii) the requested piece of section information is not stored in the section information storage unit 111, the judging unit 116 instructs the generating unit 109 to generate the requested piece of section information and instructs the extracting unit 117 to extract the piece of section information that is generated by the generating unit 109 and stored in the section information storage unit 111. In the other cases, the judging unit 116 judges that the requested piece of section information cannot be supplied to the requester recording/reproduction apparatus (home server), and notifies the requester recording/reproduction apparatus via the communication unit 107 that the requested piece of section information cannot be supplied.

It should be noted here that if (i) the server performance table indicates that the section information can be supplied to the requester home server identified by the product name and the model number of the performance information, (ii) the requested piece of section information is not stored in the section information storage unit 111, and further (iii) the content specified by the request information is not stored in the contents storage unit 104, the judging unit 116 may judge that the requested piece of section information cannot be supplied, or may acquire the content specified by the request information from the requester recording/reproduction apparatus via the communication unit 107, and instruct the generating unit 109 to generate the requested piece of section information.

The extracting unit 117, upon receiving an instruction from the judging unit 129, acquires the section information and a portion of audio data corresponding to the content specified by the request information, and transmits the acquired section information and portion of audio data to the requester home server via the communication unit 107.

The recording/reproduction apparatuses 52 and 53 have the same construction as the recording/reproduction apparatus 51 and therefore the description of the construction is omitted here.

With the above-described construction, it is possible in a home network system including a plurality of recording/reproduction apparatuses that a recording/reproduction apparatus, which can generate highly accurate section information, can supply the other recording/reproduction apparatuses in the system with highly accurate section information.

<Other Modifications>

Up to now, a preferred embodiment of the present invention has been explained. However, not limited to the embodiment, the present invention can be modified in many ways, for example, as follows.

1. The present invention may be achieved as methods for realizing the above described construction and operation. The present invention can be achieved as a computer program that causes a computer to execute such methods, or as digital signals representing such a computer program.

Furthermore, the present invention may be achieved as a computer-readable recording medium, such as a flexible disk, hard disk, CD-ROM, MO, DVD, DVD-ROM, DVD-RAM, BD (Blue-ray Disc), or semiconductor memory, in which the computer program or the digital signals are recorded. Also, the present invention may be achieved as the computer program or the digital signals recorded in such a computer-readable recording medium.

Also, the computer program or the digital signals of the present invention may be transferred via an electric communication line, wired or unwired communication line, a network represented by the Internet or the like.

The present invention may be achieved as a computer system including a microprocessor and a memory, where the memory stores the above-said computer program and the microprocessor operates in accordance with the computer program.

The computer program or the digital signals of the present invention may be transferred to an independent computer system by means of the recording medium recording the computer program or the digital signals or via the Internet or the like, and may be executed by the independent computer system.

2. The present invention can be realized as an LSI for controlling the home server apparatuses. Such an LSI is achieved by integrating part of or all of the functional blocks enclosed by a dotted line in FIG. 2 or FIG. 11. Such functional blocks may be achieved as separate chips respectively, or may be achieved as a chip in which part of or all of the functional blocks are integrated.

For example, the recording unit 102, generating unit 109 and analyzing unit 110 shown in FIG. 2 may be integrated as shown in FIG. 12. The LSI 200, upon receiving a recording instruction, converts the input video and audio data from analog to digital, and uses the video and audio encoders to encode the digital data into elementary streams (ES). The LSI 200 then multiplexes video and audio ESs into program streams (PS), and outputs the PSs to the contents storage unit 104. The encoding process conforming to MPEG2 standard includes a process of detecting amounts of characteristics by analyzing the video and audio data. For this reason, if a tag instructing to generate the section information has been attached to the received recording instruction, the LSI 200 outputs the ESs together with the analysis results that are obtained through the encoding by the video and audio encoders, and generates the section information using the analysis results.

As understood from the above description, the LSI 200 has simplified the circuit construction by allowing part of the function of the recording unit 102 and the function of the analyzing unit 110 to share the video and audio encoders.

It should be noted here that though in the above description, the term "LSI" is used, the LSI may be indicated by different terms such as IC, system LSI, super LSI or ultra LSI depending on the level of integrity.

Also, the integrated circuit is not limited to the LSI, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI.

Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

3. In the present embodiment, the contents storage system enables contents, which are distributed by ground-wave analog television broadcasting, to be used in units of sub-contents. However, the form in which the contents, which are processed by the contents storage system of the present invention, are distributed is not limited to the ground-wave analog television broadcasting. The contents storage system of the present invention can also be applied to various contents distribution forms such as ground-wave analog television broadcasting, satellite broadcasting, cable TV broadcasting, video streaming distribution via the Internet or the like.

4. The above-described embodiment and modifications may be combined for various purposes.

The present invention can be applied to, for example, a home server apparatus that records and reproduces contents that are obtained through television broadcasting.

The invention claimed is:

1. A home server apparatus for receiving, from an information supply apparatus operable to supply section information indicating how contents are each divided into sections, a piece of section information that corresponds to content that is acquired by and recorded in a contents recording unit of the home server apparatus, the home server apparatus comprising:

a requesting unit operable to request the information supply apparatus to supply first section information corresponding to the recorded content by sending, to the information supply apparatus, (i) identification information for identifying the recorded content, and (ii) criterion information that indicates a level of performance of the home server apparatus in relation to generating section information;

a receiving unit operable to receive the first section information, from the information supply apparatus, when the first section information is supplied from the information supply apparatus as a result of the information supply apparatus judging that the level of performance of the home server apparatus indicated by the criterion information sent by the requesting unit is lower than a level of performance in relation to generating section information stored in a storage unit of the information supply apparatus;

a generating unit operable to generate second section information corresponding to the recorded content, the second section information being generated when the information supply apparatus judges that the level of performance of the home server apparatus indicated by the criterion information sent by the requesting unit is equal to or higher than the level of performance in relation to generating the section information stored in the storage unit, and when the first section information is not supplied from the information supply apparatus; and a section information recording unit operable to record therein (i) the first section information corresponding to the recorded content, when the first section information is supplied from the information supply apparatus, and (ii) the second section information corresponding to the recorded content, when the first section information is not supplied from the information supply apparatus.

2. The home server apparatus of claim 1, wherein each of the contents include original sections that are cohesive in substance, and wherein start times of each section indicated by the first section information are closer to start times of the original sections than to start times of each section indicated by the second section information.

3. The home server apparatus of claim 2, wherein the first section information is generated based on amounts of a plurality of types of characteristics detected through analysis of images and audio information contained in the recorded content, and wherein the generating unit generates the second section information based on amounts of fewer types of characteristics than the plurality of types of characteristics from which the generation of the first section information is based.

4. The home server apparatus of claim 3, wherein the generating unit generates the second section information based on amounts of audio detected through analysis of audio information contained in the recorded content.

5. The home server apparatus of claim 1 wherein each piece of section information identifies each section of content by a start time, and wherein the generating unit generates the second section information by determining the start time of each section of the recorded content through analysis of the recorded content.

6. The home server apparatus of claim 5 further comprising a time correcting unit operable to correct the start time of each section indicated by the first section information by:

receiving, from the information supply apparatus, (i) a portion of audio data of the recorded content identified by the identification information and (ii) a reproduction time for the portion of audio data, the reproduction time being measured by a same clock measuring start times indicated by the first section information;

calculating a difference between a reproduction time for the portion of audio data of the recorded content and the reproduction time received from the information supply apparatus; and correcting the start times indicated by the first section information by the calculated difference.

7. The home server apparatus of claim 5 further comprising:

a selecting unit operable to select one section of the recorded content indicated by a piece of section information that has been recorded in the section information recording unit in correspondence with the recorded content; and a reproducing unit operable to reproduce the recorded content from a start time of the selected section.

8. The home server apparatus of claim 7, wherein the section information indicates, for each section of the recorded content, a characteristic image display time being a time at which an image, which is used to determine what each section of the recorded content concerns, is displayed, wherein the home server apparatus further comprises a presentation unit operable to display, as a list, images that are to be displayed at characteristic image display times indicated by the section information, and wherein the selecting unit selects a section of the recorded content that corresponds to an image that a user selects from the displayed list of images.

9. The home server apparatus of claim 1,
wherein the requesting unit further sends selection criterion information, which is used by the information supply apparatus to select one piece of section information that corresponds to one content, to the information supply apparatus, and
wherein the receiving unit receives, from the information supply apparatus, a piece of section information selected based on the selection criterion information.

10. The home server apparatus of claim 9, wherein
the selection criterion information indicates a broadcasting area to which the home server apparatus belongs, and thereby corresponds to one of the plurality of pieces of section information that corresponds to the broadcasting area, where the plurality of pieces of section information respectively correspond to a plurality of broadcasting areas.

11. The home server apparatus of claim 1,
wherein the requesting by the requesting unit is inhibited while the contents recording unit is recording a content, and the requesting is executed after the contents recording unit finishes recording the content,
wherein the generating unit generates third section information while the contents recording unit is recording the content, the third section information corresponding to sections of the content that have already been recorded by the contents recording unit, and
wherein the section information recording unit records therein the third section information corresponding to the content being recorded, if the contents recording unit is currently recording the content, and records therein the first section information corresponding to the content if the first section information is supplied after the content is recorded.

12. The home server apparatus of claim 1 further comprising a communication judging unit operable to judge whether a communication with the information supply apparatus is possible,
wherein, if the communication judging unit judges that a communication with the information supply apparatus is not possible, then (i) the requesting by the requesting unit is inhibited, (ii) the generating unit generates the second section information, and (iii) the section information recording unit records therein the second section information corresponding to the recorded content.

13. The home server apparatus of claim 1 further comprising:
a request receiving unit operable to receive, from another home server apparatus, (i) identification information for identifying a predetermined content stored in the another home server apparatus, and (ii) criterion information corresponding to the another home server apparatus;
a judging unit operable to judge, based on the criterion information corresponding to the another home server apparatus, whether to supply the another home server apparatus with a piece of section information corresponding to the predetermined content; and
a supply unit operable to supply the another home server apparatus with the piece of section information corresponding to the predetermined content if (i) the judging unit judges to supply the another home server apparatus with the piece of section information and (ii) the piece of section information corresponding to the predetermined content is stored in the section information recording unit,
wherein if (i) the judging unit judges to supply the another home server apparatus with the piece of section information and (ii) the piece of section information corresponding to the predetermined content is not stored in the section information recording unit, then the generating unit generates the piece of section information for the predetermined content, and the supply unit supplies the another home server apparatus with the piece of section information corresponding to the predetermined content.

14. The home server apparatus of claim 13,
wherein the criterion information corresponding to the another home server apparatus indicates a level of performance of the another home server apparatus in relation to generating section information, and
wherein the judging unit judges not to supply the another home server apparatus with the piece of section information if the level of performance of the another home server apparatus indicated by the criterion information is equal to or higher than the level of performance of the home server apparatus, and judges to supply the another home server apparatus with the piece of section information if the level of performance of the another home server apparatus is lower than the level of performance of the home server apparatus.

15. An integrated circuit for a home server apparatus including a storage unit and that receives, from an information supply apparatus, section information indicating how contents are each divided into sections, the integrated circuit comprising:
a recording unit operable to record a content into the storage unit;
a requesting unit operable to request the information supply apparatus to supply first section information corresponding to the recorded content by sending, to the information supply apparatus, (i) identification information for identifying the recorded content, and (ii) criterion information that indicates a level of performance of the home server apparatus in relation to generating section information;
a receiving unit operable to receive the first section information, from the information supply apparatus, when the first section information is supplied from the information supply apparatus as a result of the information supply apparatus judging that the level of performance of the home server apparatus indicated by the criterion information sent by the requesting unit is lower than a level of performance in relation to generating section information stored in a storage unit of the information supply apparatus;
a generating unit operable to generate second section information corresponding to the recorded content, the second section information being generated when the information supply apparatus judges that the level of performance of the home server apparatus indicated by the criterion information sent by the requesting unit is equal to or higher than the level of performance in relation to generating the section information stored in the storage unit of the information supply apparatus, and when the first section information is not supplied from the information supply apparatus; and
a section information recording unit operable to record therein (i) the first section information corresponding to the recorded content, when the first section information is supplied from the information supply apparatus, and (ii) the second section information corresponding to the recorded content, when the first section information is not supplied form the information supply apparatus.

16. A non-transitory computer-readable recording medium having a program recorded thereon, the program for causing a computer to execute a process of recording, into a storage apparatus, contents and section information indicating how each of the contents is divided into sections, the program causing a computer to execute a method comprising:

recording a content into the storage apparatus;

requesting the information supply apparatus to supply first section information corresponding to the recorded content by sending, to the information supply apparatus, (i) identification information for identifying the recorded content, and (ii) criterion information that indicates a level of performance of the home server apparatus in relation to generating section information;

receiving the first section information, from the information supply apparatus, when the first section information is supplied from the information supply apparatus as a result of the information supply apparatus judging that the level of performance of the home server apparatus indicated by the criterion information sent by the requesting is lower than a level of performance in relation to generating the section information stored in the storage apparatus;

generating second section information corresponding to the recorded content, the second section information being generated when the information supply apparatus judges that the level of performance of the home server apparatus indicated by the criterion information sent by the requesting is equal to or higher than the level of performance in relation to generating the section information stored in the storage apparatus, and when the first section information is not supplied from the information supply apparatus; and recording, into the storage apparatus, (i) the first section information corresponding to the recorded content, when the first section information is supplied from the information supply apparatus, and (ii) the second section information corresponding to the recorded content, when the first section information is not supplied from the information supply apparatus.

17. A home server apparatus for recording a content, the home server apparatus comprising:

a generating unit operable to generate, with use of first characteristic amount data included in the recorded content, section information that indicates how contents are each divided into sections;

a requesting unit operable to request an information supply apparatus having a higher processing ability than the home server apparatus to supply section information of the recorded content that is generated using second characteristic amount data that is larger in an amount of characteristics than the first characteristic amount data;

a storing unit operable to store the section information supplied by the information supply apparatus and the recorded content in association with each other when the section information is received from the information supply apparatus, and to store the section information generated by the home server apparatus and the recorded content in association with each other when the section information is not received from the information supply apparatus; and a reproduction unit operable to reproduce the recorded content based on the section information stored in association with the recorded content, wherein after the requesting unit requests the information supply apparatus to supply the section information, (i) the information supply apparatus does not supply the section information to the home server apparatus when a level of performance of the home server apparatus is equal to or higher than a predetermined level of performance concerning the section information, and (ii) the information supply apparatus supplies the section information to the home server apparatus when the level of performance of the home server apparatus is lower than the predetermined level of performance concerning the section information.

18. The home server apparatus of claim 17, wherein the requesting unit transmits, to the information supply apparatus, criterion information that indicates a criterion that is used to judge whether or not the information supply apparatus supplies the section information generated by the information supply apparatus to the home server apparatus, and wherein the information supply apparatus judges, based on the criterion information, whether or not the level of performance of the home sever apparatus is lower than the predetermined level of performance concerning the section information.

19. The home server apparatus of claim 18, wherein the criterion information indicates the level of performance of the home server apparatus in relation to generating the section information, and wherein the information supply apparatus judges that the level of performance of the home server apparatus is equal to or higher than the predetermined level of performance concerning the section information when the level of performance indicated by the criterion information is equal to or higher than a level of performance of the information supply apparatus, and judges that the level of performance of the home server apparatus is lower than the predetermined level of performance concerning the section information when the level of performance indicated by the criterion information is lower than the level of performance of the information supply apparatus.

20. The home server apparatus of claim 17, wherein the generating unit generates, during a recording of a content, the section information by using the first characteristic amount data included in the content that has already been recorded.

21. The home server apparatus of claim 17, wherein the first characteristic amount of data indicates an amount of characteristics that are detected by analyzing audio data of the recorded content, and wherein the second characteristic amount data indicates an amount of characteristics that are detected by analyzing the audio data and image data of the recorded content.

* * * * *